(12) United States Patent
Logan

(10) Patent No.: US 8,997,449 B2
(45) Date of Patent: Apr. 7, 2015

(54) FLOW RESTRICTOR FOR LUBRICATION LINE

(75) Inventor: Adam Logan, Hamilton (CA)

(73) Assignee: Pratt & Whitney Canada Corp., Longueuil (CA)

( * ) Notice: Subject to any disclaimer, the term of this patent is extended or adjusted under 35 U.S.C. 154(b) by 1285 days.

(21) Appl. No.: 12/341,140

(22) Filed: Dec. 22, 2008

(65) Prior Publication Data

US 2010/0154427 A1    Jun. 24, 2010

(51) Int. Cl.
*F01D 25/18*    (2006.01)
*F16N 7/40*    (2006.01)

(52) U.S. Cl.
CPC  *F01D 25/18* (2013.01); *F16N 7/40* (2013.01); *F16N 2270/22* (2013.01)

(58) Field of Classification Search
CPC ......... F01D 25/18; F02C 7/06; F16N 27/005; F16L 55/02709
USPC .................. 60/39.08, 772; 184/6.11, 7.3, 7.4; 138/40
See application file for complete search history.

(56) References Cited

U.S. PATENT DOCUMENTS

| | | | |
|---|---|---|---|
| 2,017,847 A | 10/1935 | Bijur | |
| 2,761,281 A | 9/1956 | Armer | |
| 3,071,160 A * | 1/1963 | Weichbrod | 138/40 |
| 3,451,214 A * | 6/1969 | Bradley | 60/788 |
| 3,506,885 A * | 4/1970 | Roberts et al. | 361/508 |
| 3,645,298 A * | 2/1972 | Roberts et al. | 138/40 |
| 3,951,476 A | 4/1976 | Schulien et al. | |
| 3,983,693 A | 10/1976 | Werner | |
| 3,983,903 A * | 10/1976 | Kuehn, Jr. | 138/40 |
| 4,171,611 A * | 10/1979 | Hueller | 60/39.08 |
| 4,513,704 A | 4/1985 | Evans | |
| 5,176,174 A * | 1/1993 | Toraason et al. | 137/590 |
| 5,253,470 A | 10/1993 | Newton | |
| 5,517,959 A | 5/1996 | Kato et al. | |
| 5,662,188 A | 9/1997 | Ito et al. | |
| 5,680,557 A * | 10/1997 | Karamchetty | 715/866 |
| 5,911,678 A * | 6/1999 | White | 60/39.08 |
| 5,975,042 A | 11/1999 | Aizawa et al. | |
| 6,139,280 A * | 10/2000 | Holt et al. | 417/26 |
| 6,401,870 B2 | 6/2002 | Roy et al. | |
| 7,163,086 B2 | 1/2007 | Care et al. | |
| 7,216,473 B1 * | 5/2007 | McArthur et al. | 60/39.08 |
| 7,431,052 B2 * | 10/2008 | Gravesen et al. | 138/40 |
| 7,640,723 B2 * | 1/2010 | Alexander | 60/39.08 |
| 2006/0278289 A1 * | 12/2006 | Robinson | 138/40 |
| 2009/0211657 A1 * | 8/2009 | Dirac | 137/896 |

* cited by examiner

*Primary Examiner* — Phutthiwat Wongwian
*Assistant Examiner* — Michael B Mantyla
(74) *Attorney, Agent, or Firm* — Norton Rose Fulbright Canada LLP

(57) ABSTRACT

A flow restrictor is provided for a lubrication circulation system. The flow restrictor comprises a body configured to obstruct a flow of lubricant within the lubricant circulation system. The body has one or more through holes communicating with upstream and downstream portions of the lubrication circulation system. Each of the one or more holes has a cross-sectional area sufficiently small, and a length sufficiently long, to prevent turbulent lubricant flow therethrough at temperatures below a first predetermined reference temperature. The one or more holes have sufficient aggregate cross-sectional area to allow a desired lubricant flow rate through the body at temperatures at or above a second predetermined reference temperature.

14 Claims, 3 Drawing Sheets

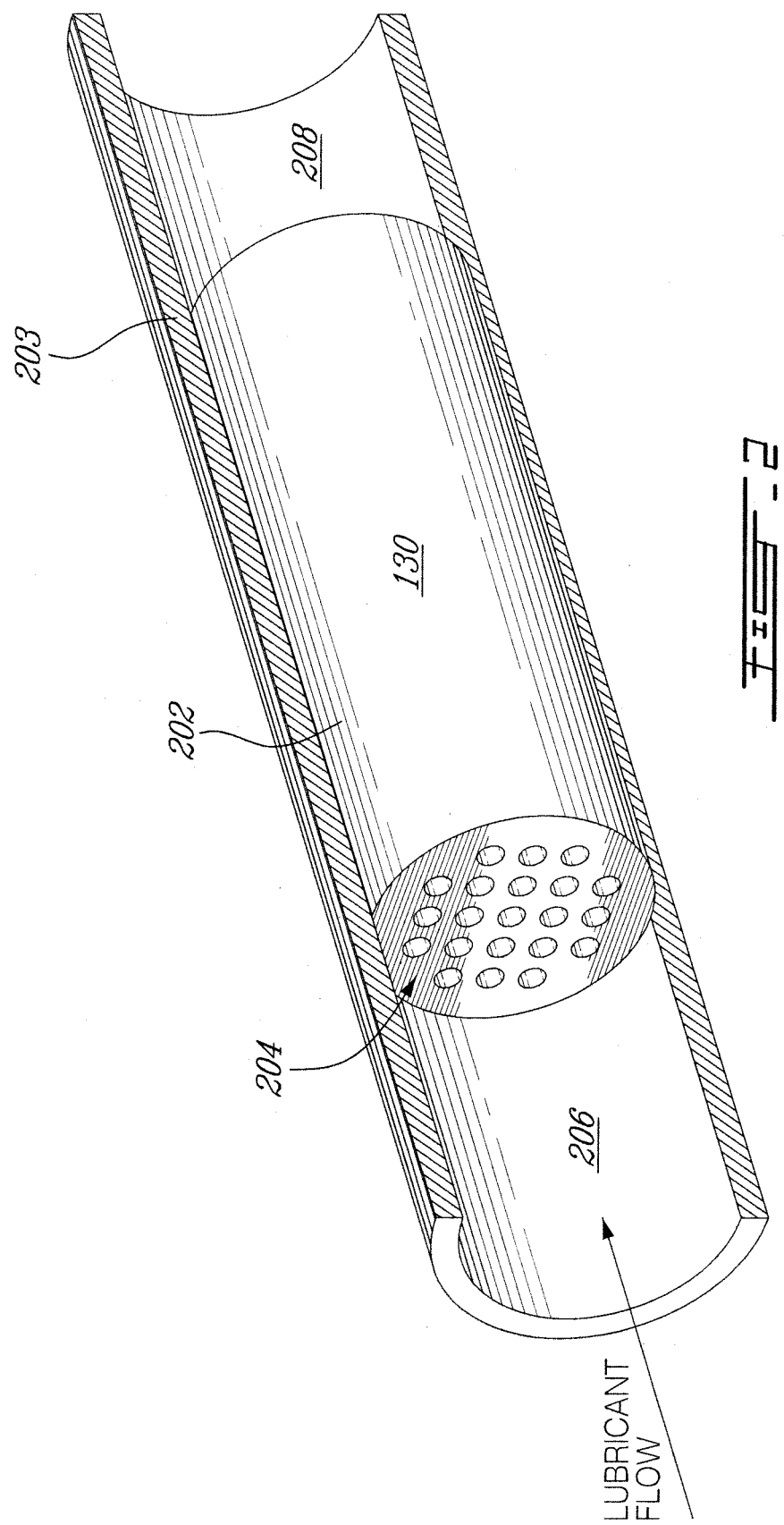

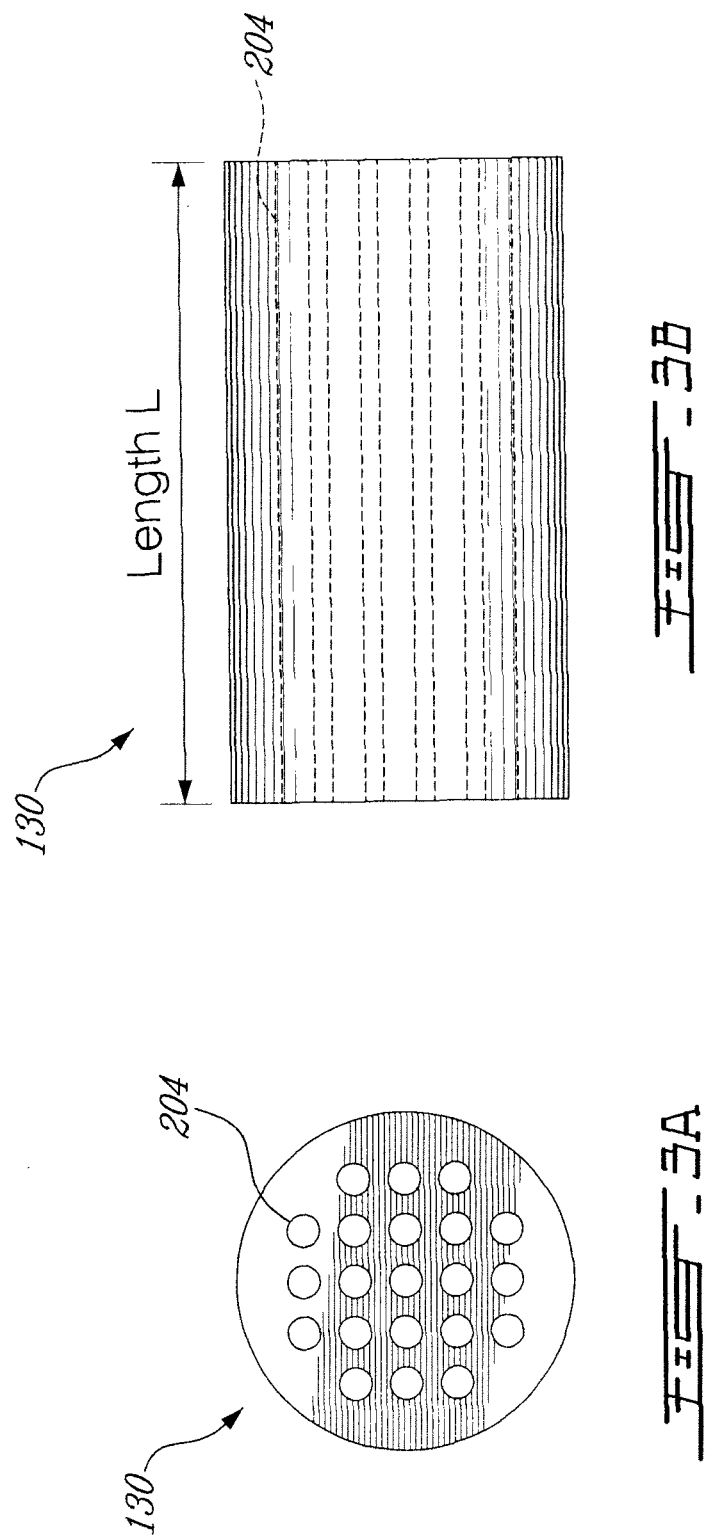

US 8,997,449 B2

FLOW RESTRICTOR FOR LUBRICATION LINE

TECHNICAL FIELD

The application relates generally to lubrication systems, and more particularly to a flow restrictor for a gas turbine engine lubrication line.

BACKGROUND OF THE ART

When starting an aircraft engine in very cold weather, a check valve or thermally activated valve is needed in the oil system to address the problem of extreme oil viscosity in low temperatures. These valves typically provide an oil bypass so that the oil is not delivered to the engine until the oil begins to warm and the engine oil system can function in its normal operating temperature range. A gas turbine engine usually has enough residual oil on its moving parts to allow it to start without needing additional oil at start-up. However, check valves or thermally activated valves are prone to failure, which can be detrimental to aircraft engine lifespan and reliability if either cold, highly viscous oil is allowed to flow at start-up or if no oil reaches the engine after the engine has been started.

There is thus a need for a flow control device that is generally more reliable and not prone to failure.

SUMMARY

The subject matter of the present disclosure aims to provide an improved approach to flow control in lubrication systems when starting, motoring, and/or windmilling aircraft engines in cold weather.

Therefore, one aspect of the present disclosure provides a gas turbine engine lubrication system comprising a flow restrictor having a body configured to obstruct a flow of lubricant within a lubricant supply line. The body has a plurality of through holes communicating with upstream and downstream portions of the lubricant supply line. Each of the plurality of through holes has a cross-sectional area sufficiently small, and a length sufficiently long, to prevent turbulent lubricant flow therethrough at temperatures below a first predetermined reference temperature. The holes have sufficient aggregate cross-sectional area to allow a desired lubricant flow rate through the body at temperatures at or above a gas turbine engine operating temperature.

In a further aspect, the current disclosure provides a turbine engine comprising a lubrication system. The lubrication system has at least one lubrication flow restrictor. The at least one lubrication flow restrictor comprises a body configured to obstruct a flow of lubricant within the lubrication system. The body has one or more through holes communicating with upstream and downstream portions of the lubrication system. Each of the one or more holes has a cross-sectional area sufficiently small, and a length sufficient long, to prevent turbulent lubricant flow therethrough at temperatures below a first predetermined reference temperature. The one or more holes have sufficient aggregate cross-sectional area to allow a desired lubricant flow rate through the body at temperatures at or above a second predetermined reference temperature.

In a further aspect, the present disclosure provides a method of operating a gas turbine engine in cold weather. The gas turbine engine has a lubrication system. The method comprises providing a flow restrictor in a lubricant supply line of the lubrication system; preventing turbulent lubricant flow through the lubrication system at temperatures below a first predetermined reference temperature; and allowing a desired lubricant flow rate through the lubrication system at temperatures at or above a gas turbine engine operating temperature.

DESCRIPTION OF THE DRAWINGS

Reference is now made to the accompanying drawings, in which:

FIG. 2 is a perspective view of an embodiment of a flow restrictor for use in the oil system shown in FIG. 1; and FIGS. 3a and 3b respectively illustrate front and side views of the flow restrictor shown in FIG. 2.

DETAILED DESCRIPTION

Figure 1:
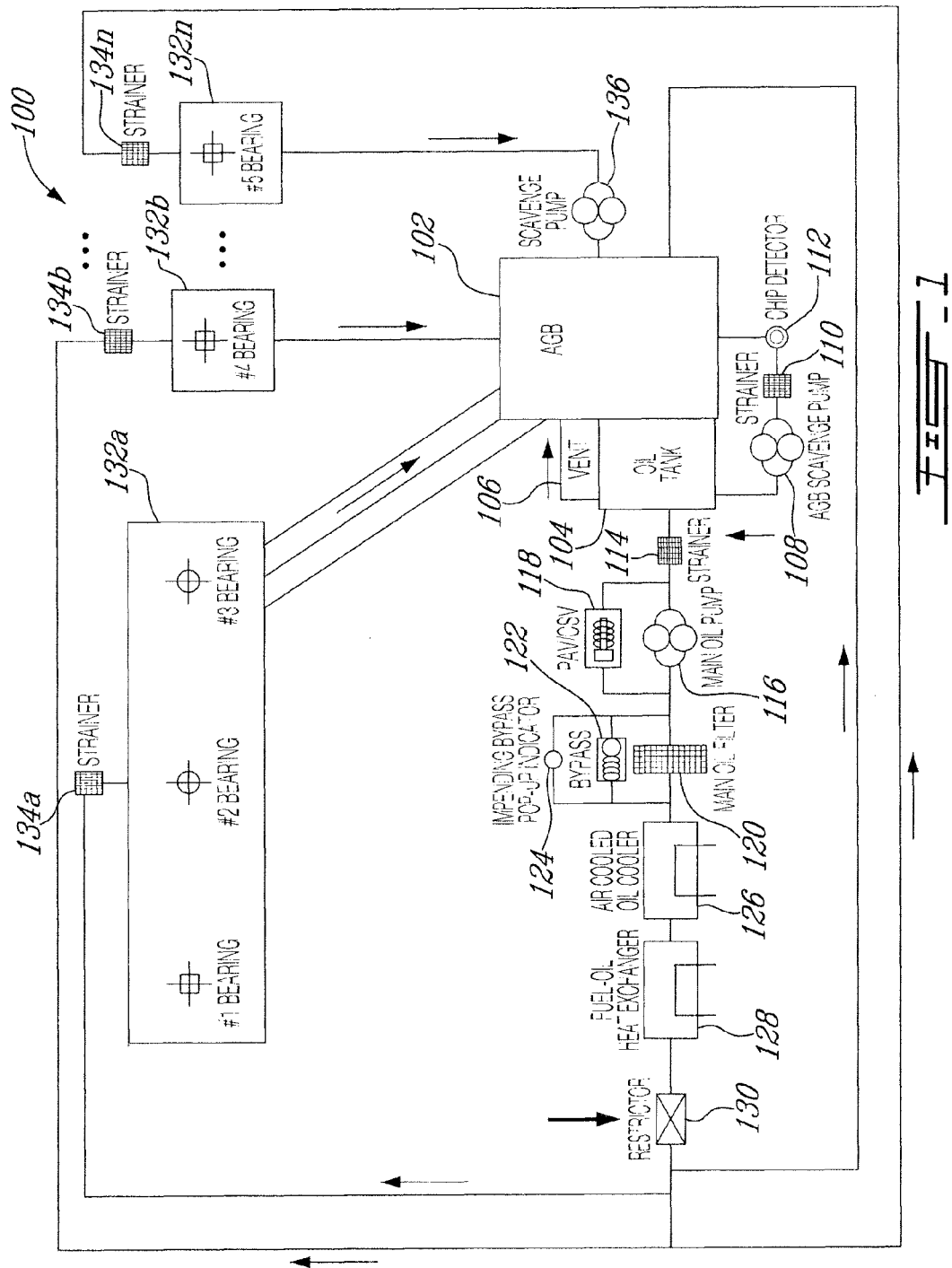
FIG. 1 is a schematic view of a typical oil system in a gas turbine engine.

Referring to FIG. 1, a schematic view of a typical lubricant circulation system 100 in a gas turbine engine is shown. The lubricant circulation system 100 may also be more generally referred to as lubricant system 100. In one example, the lubricant used in the lubricant system may be oil. However, the lubricant system 100 is not limited to oil and any suitable lubricant may be used. The lubricant system 100 generally includes an accessory gear box 102, which may have an associated oil tank 104, vent 106, and oil cleaning system including an accessory gear box scavenger pump 108, strainer 110, and chip detector 112. The lubricant system 100 generally further includes a strainer 114, main oil pump 116, and associated pressure alert valve/cycle stop valve 118, which may be further connected to a main oil filter 120 having an associated bypass valve 122 and impending bypass pop-up indicator 124. The lubricant system 100 generally further includes an air-cooled oil cooler 126, a fuel-oil heat exchanger 128, and a restrictor device 130 mounted downstream of the main oil pump 116 in the engine oil supply line. The lubricant path of the lubricant system 100 generally leads from the flow restrictor 130 back to the accessory gear box 102 and also to bearings 132 of a bearing cavity in the gas turbine engine. The set of bearings are individually indicated by references 132a, 132b, . . . 132n, and it will be appreciated by those skilled in the art that a gas turbine engine may have any number of bearings, depending on the design criteria of a particular application. The bearings 132 may also have associated strainers 134, individually indicated as 134a, 134b, . . . 134n, in the bearing oil supply line. The lubricant system 100 may further have a scavenge pump 136 to draw the lubricant from bearing 132n.

The lubricant system 100 shown in FIG. 1 is intended to be exemplary to illustrate a context to the subject matter of the present disclosure, which relates to the restrictor device 130. Any number of changes may be made to the lubricant system 100, which includes suitably adding additional components, removing existing components, or changing the configuration of the existing components, without affecting the intended scope or applicability of the restrictor device 130, to be discussed below in connection with FIGS. 2 and 3.

In general terms, the temperature dependence of liquid viscosity describes the relationship by which liquid viscosity tends to fall as its temperature increases. Alternatively, the fluidity of liquid tends to increase as temperature increases. This relationship has been modeled by a number of models, including the exponential model, the Arrhenius model, the Williams-Landel-Ferry model, and the Seeton fit.

Referring now to FIG. 2, a perspective view of an embodiment of a flow restrictor device 130, or simply a flow restrictor 130, for use in the lubricant system 100 is shown. The flow restrictor 130 generally has a body 202 that is configured to obstruct a flow of lubricant within supply line 203. In one example, the body 202 may have the general shape of a cylinder, resulting in a cylindrical body having an axis. The body 202 has one or more through holes 204. The through holes 204 communicate with an upstream portion 206 of the supply line 203 and a downstream portion 208 thereof. In one example, the holes 204 are formed in the body 202 in substantially the axial direction of the body 202. In another example, the through holes 204 may be formed in the body 202 at an angle to the axial direction of the body 202. Each of the one or more holes 204 has a cross-sectional area that is sufficiently small and a length that is sufficiently long to prevent turbulent lubricant flow through the holes 204 at temperatures below a predetermined reference lubricant operating temperature. The holes 204 also have sufficient aggregate cross-sectional area to allow a desired lubricant flow rate through the body 202 at temperatures at or above another predetermined reference temperature (e.g., a second reference temperature).

Referring now to FIGS. 3a and 3b, front and side views of the flow restrictor 130 are illustrated. The flow restrictor 130 may be installed, for example, in a bearing oil supply line of a turbine engine. The flow restrictor 130 may be designed to provide significantly increased flow resistance to cold oil. Generally, the body 202 of the flow restrictor 130 may be constructed of a thick plate having a thickness or length L, shown in FIG. 3b. The holes 204 may be formed, for example, by drilling through the length L of the thick plate. In one example, n holes 204 may be drilled through the thick plate, with each hole having a diameter d. Generally, the diameter d is maintained to be significantly smaller than the length of the plate L.

In the example shown in FIGS. 2 and 3, the diameter d of each of the holes 204 is chosen to ensure that the lubricant flow remains laminar at lubricant temperatures below the engine lubricant temperature operating range. The length L of the oil passages defined by the holes 204 is chosen to ensure sufficient friction area to create the needed pressure loss to achieve this laminar flow, where this pressure loss is directly proportional to the lubricant viscosity for laminar flow. The lubricant viscosity changes exponentially with the lubricant temperature, which results in the lubricant flow pressure loss changing exponentially with the lubricant temperature. An almost complete lubricant flow blockage results at low lubricant temperatures and a nearly free lubricant flow results at lubricant temperatures in the normal turbine operating range. The number of oil passages defined by the number of holes n is determined in order to ensure a nearly unrestricted lubricant flow (e.g., normally expected lubricant flow) in the normal temperature operating range for turbines. In one example, a significant oil flow reduction may be achieved below 100 degrees Fahrenheit with little or no significant flow reduction above 200 degrees Fahrenheit, based on the normal working temperatures of the system 100 and the properties of the engine oil. The minimum system oil temperature at the restrictor location may typically be −40 degrees Fahrenheit while maximum normal oil temperature may approach 300 degrees Fahrenheit.

A number of parameters may be defined, which include:

$$\text{wetted\_perimeter}(P_W) = \pi dn; \text{ and}$$

$$\text{total\_flow\_area} = \frac{n\Pi d^2}{4};$$

where d and n are defined above.

In one embodiment, d and n are chosen with the aim to achieve acceptable hot oil pressure drop, which is driven by total flow area through the flow restrictor 130, and to also minimize cold oil flow as needed, which is driven by viscous loss. Viscous loss is proportional to L/d. To increase viscous effects, L may be increased and/or the wetted perimeter may be increased while maintaining the total flow area. Further, it will be appreciated that the size d of the holes 204 should be kept large enough to avoid blockage due to contamination.

In one example, lubricant may pass through a flow restrictor 130 that is approximately 1.1 inches long and has a diameter of 0.175 inches. It may be desirable to maintain a minimum diameter d of the holes 204 of at least 0.040 inches, for example in consideration of avoiding blockages. In one example, the variables n=14 and d=0.050 inches may be chosen and were found to deliver suitable performance. In another example, the variables n=24 and d=0.040 inches may be chosen and were found to deliver suitable performance. The effect may be more pronounced as hole size d decreases and flow length L increases. An optimal solution, if one exists, may depend on the system flows, operating temperatures, and target allowable hot pressure drop. In one example, a minimum hole size d of approximately 0.020 inches may be used to avoid problems with contamination and a maximum length L of approximately 2 inches may minimize envelope requirements.

In another example, the diameters d of the holes 204 may vary, such that not all the diameters d of the holes n are the same, but the diameter of any particular hole through the length L of the flow restrictor 130 will remain constant. Using varied holes sizes may provide some advantages, such as for example, two or more classes of hole sizes may be used such that if the smallest holes became blocked due to contamination, a minimum or safe amount of flow would continue to be delivered to the engine through the larger holes.

One aspect of the present application aims to prevent oil leakage from the system 100 during cold conditions (e.g., start, motoring, windmilling) when the oil does not easily drain from the various cavities in the system 100. To prevent leakage the amount of oil that flows into the cavities may be reduced until the oil sufficiently warms so that it can easily drain.

The above descriptions are meant to be exemplary only, and one skilled in the art will recognize that changes may be made to the embodiments described without departing from the scope of the subject matter disclosed. Still other modifications which fall within the scope of the described subject matter will be apparent to those skilled in the art, in light of a review of this disclosure, and such modifications are intended to fall within the appended claims.

What is claimed is:

1. A gas turbine engine lubrication system for supplying lubricant to a gas turbine engine, the system comprising a flow restrictor having a body configured to obstruct a flow of lubricant within a lubricant supply line, the body having a plurality of through holes communicating with upstream and downstream portions of the lubricant supply line, the lubricant supply line and the flow restrictor being connected in fluid flow communication with a source of lubricant and the gas turbine engine at engine start-up and during normal engine operating conditions, the flow restrictor being positioned so that all the lubricant flowing from the source to the engine has to flow through the flow restrictor;

each of the plurality of through holes having a cross-sectional area sufficiently small, and a length sufficiently long, to prevent turbulence in the lubricant flowing therethrough at temperatures below a first predetermined reference temperature and automatically restrict the flow of lubricant to the engine during engine cold start-up conditions; and the through holes having sufficient aggregate cross-sectional area to allow a desired flow of lubricant through the body at temperatures at or above a gas turbine engine operating temperature;

wherein the body has an upstream end, a downstream end, and a cylindrical body between the two ends, and wherein each of the plurality of through holes extend substantially axially through the upstream end, the cylindrical body and the downstream end;

wherein the plurality of through holes comprise a plurality of circular holes, each circular hole having a substantially constant diameter over the length of the hole, and wherein the diameter of each hole is smaller than the length of the respective hole.

2. The gas turbine engine lubrication system of claim 1, wherein a diameter of each of the plurality of holes is between approximately 0.020 inches and 0.060 inches.

3. The gas turbine engine lubrication system of claim 1, wherein a length of the flow restrictor is between approximately 1 inch and 2 inches.

4. The gas turbine engine lubrication system of claim 1, wherein the lubricant includes oil.

5. The gas turbine engine lubrication system of claim 1, wherein the lubrication system supplies lubricant to bearings in a bearing cavity of the gas turbine engine, the flow restrictor being positioned between the bearing cavity and a supply pump of the lubrication system.

6. The gas turbine engine lubrication system of claim 1, wherein the first predetermined reference temperature is approximately 100 degrees Fahrenheit and the gas turbine engine operating temperature is approximately greater than 200 degrees Fahrenheit.

7. A turbine engine comprising a lubrication system, the lubrication system having at least one lubrication flow restrictor, the at least one lubrication flow restrictor being connected in fluid flow communication with a source of lubricant and the engine at engine start-up as well as during normal engine operation, the at least one lubrication flow restrictor being positioned so that all the lubricant flowing from the source to the engine has to flow through the at least one lubricant flow restrictor, the at least one lubrication flow restrictor being disposed to provide a variable lubricant flow to the engine based on the lubricant temperature, the at least one lubrication flow restrictor comprising:

a body configured to obstruct a flow of lubricant within the lubrication system, the body having a plurality of through holes communicating with upstream and downstream portions of the lubrication system;

each of the plurality of through holes having a cross-sectional area sufficiently small, and a length sufficient long, to prevent turbulence in the lubricant flowing therethrough and to restrict the lubricant flow to the engine at temperatures below a first predetermined reference temperature; and the plurality of through holes having sufficient aggregate cross-sectional area to allow a desired lubricant flow rate through the body at temperatures at or above a second predetermined reference temperature;

wherein the body has an upstream end, a downstream end, and a cylindrical body between the two ends, and wherein the plurality of through holes extend substantially axially through the upstream end, the cylindrical body and the downstream end;

wherein the plurality of through holes comprise a plurality of circular holes, each circular hole having a substantially constant diameter over the length of the hole, and wherein the diameter of each hole is smaller than the length of the respective hole.

8. The turbine engine of claim 7, wherein the plurality of through holes comprise a plurality of circular holes, the circular holes having differing diameters, with each circular hole having a substantially constant diameter over the length of the hole.

9. The turbine engine of claim 7, wherein a diameter of each of the plurality of through holes is between approximately 0.020 inches and 0.050 inches.

10. The turbine engine of claim 7, wherein a length of the flow restrictor is between approximately 1 inch and 2 inches.

11. The turbine engine of claim 7, wherein the first predetermined reference temperature is approximately 100 degrees Fahrenheit and the second predetermined reference temperature is approximately 200 degrees Fahrenheit.

12. A method of operating a gas turbine engine in cold weather, the gas turbine engine having a lubrication system supplying a lubricant to the engine, the method comprising:

in response to a temperature of the engine being below a first predetermined temperature and the lubricant having a first viscosity, restricting a lubricant flow with a flow restrictor in a lubricant supply line of the lubrication system and preventing turbulence in the lubricant flow through the lubrication system, the flow restrictor being connected in fluid flow communication with a source of the lubricant and the engine at engine start-up and during normal engine operation; and in response to a temperature of the engine being at or above a second predetermined temperature and the lubricant having a second viscosity higher than the first viscosity, allowing the lubricant to flow through the flow restrictor at a desired lubricant flow rate;

wherein the flow restrictor has a body configured to obstruct the flow of lubricant within the lubricant supply line, the body having a plurality of through holes communicating with upstream and downstream portions of the lubricant supply line, each of the plurality of through holes having a cross-sectional area sufficiently small and a length sufficiently long to prevent turbulent turbulence in the lubricant flow through the lubrication system at temperatures below the first predetermined temperature, and the through holes having sufficient aggregate cross-sectional area to allow a desired lubricant flow rate through the body at temperatures at or above the second predetermined temperature;

wherein the body has an upstream end, a downstream end, and a cylindrical body between the two ends, and wherein the plurality of through holes extend substantially axially through the upstream end, the cylindrical body and the downstream end;

wherein the plurality of through holes comprise a plurality of circular holes, each circular hole having a substantially constant diameter over the length of the hole, and wherein the diameter of each hole is smaller than the length of the respective hole.

13. The method of claim 12, wherein a diameter of each of the plurality of through holes is between approximately 0.020 inches and 0.060 inches and a length of the flow restrictor is between approximately 1 inch and 2 inches.

14. The method of claim 12, wherein the first predetermined temperature is approximately 100 degrees Fahrenheit and the second predetermined temperature is approximately 200 degrees Fahrenheit.

\* \* \* \* \*